(12) United States Patent
Kim

(10) Patent No.: US 9,709,669 B2
(45) Date of Patent: Jul. 18, 2017

(54) DISTANCE MEASURING METHOD AND EQUIPMENT USING OPTICAL SIGNAL

(71) Applicant: Tae Min Kim, Gyeongsangbuk-do (KR)

(72) Inventor: Tae Min Kim, Gyeongsangbuk-do (KR)

( * ) Notice: Subject to any disclaimer, the term of this patent is extended or adjusted under 35 U.S.C. 154(b) by 388 days.

(21) Appl. No.: 14/367,045

(22) PCT Filed: May 29, 2013

(86) PCT No.: PCT/KR2013/004703
§ 371 (c)(1),
(2) Date: Jun. 19, 2014

(87) PCT Pub. No.: WO2014/175502
PCT Pub. Date: Oct. 30, 2014

(65) Prior Publication Data
US 2015/0301162 A1  Oct. 22, 2015

(30) Foreign Application Priority Data

Apr. 23, 2013  (KR) .................. 10-2013-0044833

(51) Int. Cl.
| | | |
|---|---|---|
| *G01C 3/08* | (2006.01) | |
| *G01S 7/486* | (2006.01) | |
| *G01S 17/36* | (2006.01) | |
| *G01S 17/10* | (2006.01) | |
| *G01S 7/491* | (2006.01) | |
| *G01S 17/93* | (2006.01) | |

(52) U.S. Cl.
CPC .......... *G01S 7/4868* (2013.01); *G01S 7/4915* (2013.01); *G01S 17/102* (2013.01); *G01S 17/36* (2013.01); *G01S 17/107* (2013.01); *G01S 17/936* (2013.01)

(58) Field of Classification Search
CPC ...... G01S 7/4868; G01S 7/4915; G01S 17/36; G01S 17/102; G01S 17/107
USPC ....................................................... 356/5.01
See application file for complete search history.

(56) References Cited

U.S. PATENT DOCUMENTS

| | | | |
|---|---|---|---|
| 5,082,364 A | 1/1992 | Russell | |
| 6,703,967 B1 | 3/2004 | Kuroda | |
| 7,391,505 B2 | 6/2008 | Dorrington | |
| 7,548,320 B2 * | 6/2009 | Chan ..................... | A61B 3/102 356/497 |

(Continued)

FOREIGN PATENT DOCUMENTS

WO    WO 01/55745 A1    8/2001

*Primary Examiner* — Mark Hellner
(74) *Attorney, Agent, or Firm* — Rabin & Berdo, P.C.

(57) ABSTRACT

The present invention relates to distance measuring method and equipment which consists of a stage that receives multiple signals reflected from the target of measuring through the operation of the shutter, a stage that calculates the phase difference between transmitting and receiving signals based on said multiple signals received at said different phases, and a stage that calculates the distance between said target of measurement and a distance measuring equipment based on said phase difference, and said multiple signals may be of same frequency and amplitude. Therefore, the phase difference between transmitting and receiving signals can be determined accurately and the distance to the objects can be accurately recognized.

12 Claims, 14 Drawing Sheets

(56) References Cited

U.S. PATENT DOCUMENTS 7,834,985 B2 * 11/2010 Morcom ................ G01S 17/08
356/5.03
2007/0171395 A1 7/2007 Dorrington

* cited by examiner

DISTANCE MEASURING METHOD AND EQUIPMENT USING OPTICAL SIGNAL

TECHNICAL FIELD

The present invention relates to distance measuring method and equipment. More particularly, the present invention relates to distance measuring method and equipment using optical signal.

DESCRIPTION OF RELATED ART

A LIDAR (light detection and ranging) sensor is a device designed to detect a distance to a target, the direction, speed, temperature, material distribution, and concentration of the target by illuminating it with a laser and analyzing the reflected light.

Taking advantages of the laser which can generate pulses of high energy density and short cycle or square wave signals, a LIDAR sensor is used to get more accurate measurement of properties in the air and distance.

A LIDAR sensing technology was first attempted in 1930s to analyze the density in the upper air through the scattering strength of a searchlight but a full-fledged development of it was possible only after the invention of the laser in 1960s. Since 1970s, together with a continuous development of laser light source technology, various LIDAR sensing technologies to be applied in many fields have been developed.

LIDAR sensors are mounted on airplanes or satellites and applied as an important observation technology for a detail air analysis and earth environment observation. They are also mounted on spacecraft or exploration robot and used as a complementary mean for the functions of camera such as measuring a distance to an object.

LIDARs can also be ground-based, coming in a simple form for remote sensing or speed enforcement. In recent years, as a key technology for enabling 3D reverse engineering, laser scanner for driverless vehicle, and 3D imaging camera, LIDARs have improved both in applications and significance.

In the past, LIDARs were developed for meteorological applications and distance measuring. Recently, such LIDAR technologies are developed for meteorological observation at satellite, unmanned robot sensor or 3D image modeling.

A LIDAR sensor system has basically several components including laser source, laser detector, signal collector and processor, and data transmitter/receiver, though it may be configured very complicatedly depending upon applications.

There are two kinds of LIDAR detection schemes: "time-of-flight (TOF)" system and "phase-shift" system.

TOF systems calculate distances to the objects by measuring the time for the pulse or square wave signal emitted by a laser and reflected from the objects to return the receiver.

Phase-shift systems use a laser beam continuously modulated with a certain frequency and calculate the time and distance by measuring the phase shift of the signal reflected from the object to return.

Traditional phase-shift systems calculated the phase difference between transmitting signal and receiving signal by obtaining the signal of each phase through opening and closing the shutter many times at one cycle wavelength for one signal.

In such case, the price of a shooting camera rises, because a high-speed shutter should be implemented for the shutter to operate many times at one cycle wavelength. Moreover, in high-speed photography, it was often failed to shoot the signal at a desired phase.

DESCRIPTION OF THE INVENTION

Technical Task

In order to solve the abovementioned problem, the first purpose of the present invention is to provide distance measuring method by idealizing the phase shift between transmitting and receiving optical signals even with a camera equipment that has a low-speed shutter.

The second purpose of the present invention is to provide distance measuring equipment by idealizing the phase shift between transmitting and receiving optical signals even with camera equipment that has a low-speed shutter.

Means to Solve the Task

In order to achieve the first purpose of the present invention, distance measuring method using the phase difference of optical signal according to the first embodiment of the present invention consists of a stage that receives multiple signals of same frequency and amplitude reflected from a target of measurement at different phases through the operation of the shutter, a stage that calculates the phase difference between transmitting and receiving signals based on said multiple signals received at said different phases, and a stage that calculates the distance between said target of measurement and a distance measuring equipment based on said phase difference.

Said stage that receives multiple signals reflected from said target of measurement at different phases through the operation of the shutter may consist of a stage that receives Signal 1 reflected from said target of measurement through the operation of Shutter 1 at Phase 1, a stage that receives Signal 2 reflected from said target of measurement through the operation of Shutter 2 at Phase 2, a stage that receives Signal 3 reflected from said target of measurement through the operation of Shutter 3 at Phase 3, and a stage that receives Signal 4 reflected from said target of measurement through the operation of Shutter 4 at Phase 4.

Said stage that calculates the phase difference between transmitting and receiving signals based on said multiple signals received at said different phases may consist of a stage that calculates the amplitude information of said Signal 1 received in said Phase 1, a stage that calculates the amplitude information of said Signal 2 received in said Phase 2, a stage that calculates the amplitude information of said Signal 3 received in said Phase 3, a stage that calculates the amplitude information of said Signal 4 received in said Phase 4, a stage that calculates the phase difference between said transmitting and receiving signals based on said amplitude information of Signal 1, said amplitude information of Signal 2, said amplitude information of Signal 3, and said amplitude information of Signal 4.

Said Signal 1, said Signal 2, said Signal 3, and said Signal 4 are sine wave, pulse, or square wave signal received in order, and said Phase 1, said Phase 2, said Phase 3, and said Phase 4 are 0 degree, 90 degrees, 180 degrees, and 270 degrees, respectively.

Said stage that calculates the phase difference between transmitting and receiving signals based on said multiple signals received at said different phases consists of a stage that calculates the quantity of light charged in the photocell of said Signal 1 received in said Phase 1, a stage that calculates the quantity of light charged in the photocell of said Signal 2 received in said Phase 2, a stage that calculates the quantity of light charged in the photocell of said Signal 3 received in said Phase 3, a stage that calculates the quantity of light charged in the photocell of said Signal 4 received in said Phase 4, and a stage that calculates the phase difference between said transmitting and receiving signals based on the quantity of light charged in each of the photocells of said Signal 1, said Signal 2, said Signal 3, and said Signal 4.

Said distance measuring method includes another stage that transmits said multiple signals to said target of measurement in order, and said multiple signals may be said Signal 1, said Signal 2, said Signal 3, and said Signal 4 and transmitted in order based on shutter speed which receives said Signal 1, said Signal 2, said Signal 3, and said Signal 4.

In order to achieve the second purpose of the present invention, distance measuring equipment using the phase difference of optical signal according to the second embodiment of the present invention consists of a signal transmitter which transmits multiple signals of same frequency and amplitude, a signal receiving part which receives said multiple signals reflected from a target of measurement at different phases, and a control part which calculates the phase difference between transmitting and receiving signals based on said multiple signals received at different phases and calculates the distance between said target of measurement and distance measuring equipment based on said phase difference.

Said signal receiving part may be embodied so as to receive Signal 1 reflected from said target of measurement through the operation of Shutter 1 at Phase 1, Signal 2 reflected from said target of measurement through the operation of Shutter 2 at Phase 2, Signal 3 reflected from said target of measurement through the operation of Shutter 3 at Phase 3, and Signal 4 reflected from said target of measurement through the operation of Shutter 4 at Phase 4.

Said control part may be embodied so as to calculate the amplitude information of said Signal 1 received at said Phase 1, the amplitude information of said Signal 2 received at said Phase 2, the amplitude information of said Signal 3 received at said Phase 3, the amplitude information of said Signal 4 received at said Phase 4, and the phase difference between said transmitting and receiving signals based on the amplitude information of said Signal 4.

Said Signal 1, said Signal 2, said Signal 3, and said Signal 4 are sine wave, pulse, or square wave signal received in order, and said Phase 1, said Phase 2, said Phase 3, and said Phase 4 are 0 degree, 90 degrees, 180 degrees, and 270 degrees, respectively.

Said control part may be embodied so as to calculate the quantity of light charged in the photocell of said Signal 1 received in said Phase 1, the quantity of light charged in the photocell of said Signal 2 received in said Phase 2, the quantity of light charged in the photocell of said Signal 3 received in said Phase 3, the quantity of light charged in the photocell of said Signal 4 received in said Phase 4, and the phase difference between said transmitting and receiving signals based on the quantity of light charged in each of the photocells of said Signal 1, said Signal 2, said Signal 3, and said Signal 4.

Said signal transmitting part may be embodied to transmit said multiple signals to said target of measurement in order and said multiple signals may be said Signal 1, said Signal 2, said Signal 3, and said Signal 4, which are transmitted in order based on shutter speed that receives said Signal 1, said Signal 2, said Signal 3, and said Signal 4.

Effects of the Invention

As abovementioned, distance measuring method using multiple optical signals and equipment thereof according to the embodiment of the present invention can calculate the phase difference between transmitting and receiving signals accurately even with a distance measuring equipment of a low-speed shutter. Therefore, the distance between distance measuring equipment and an object can be exactly perceived.

THE BEST FORM FOR EMBODIMENT OF THE INVENTION

As the present invention may have various alternations and embodiments, several embodiments will be depicted in figures with detailed explanations. This, however, is not to limit the present invention to a certain form of embodiment but should be understood to include all alterations, equivalences or alternatives falling under the ideas and technical range of the present invention. Similar reference symbols are used for similar components in the explanation of each figure.

Although such terms as the $1^{st}$, the $2^{nd}$, etc. may be used to explain various components, said components should not be limited by said terms. Said terms should be used only for the purpose of distinguishing one from another component. For example, while not deviating from the scope of the right of the present invention, the term of 'the $1^{st}$ component' may be named 'the $2^{nd}$ component', and likewise, the $2^{nd}$ component' may also be name 'the $1^{st}$ component'. The term 'and/or' includes either the combination of multiple related items or any item among such multiple related items.

Each of the terms used in the present invention merely intend to describe a certain embodiment, not to limit the present invention. The singular includes the plural, unless otherwise contextually meant. In the present invention, the term such as "include" or "have" should be understood to indicate that characteristics, numbers, stages, operations, components, parts stated in the specifications, or combinations thereof, and not to exclude in advance any possibilities of the existence or addition of one or more other characteristics, numbers, stages, operations, components, parts or combinations thereof.

From now on, desirable embodiments of the present invention will be described in detail on reference to the attached figures. Same reference symbols will be used for same components and overlapped explanation for same component will be avoided.

A light source used for measuring distances in the embodiments of the present invention is a laser source of particular wavelengths ranging from 250 nm to 11 □m or a wavelength-swept laser. For example, small and low-power semiconductor laser diodes such as LEDs (light emitting diodes) or LDs (laser diodes) can be frequently used.

Figure 1:
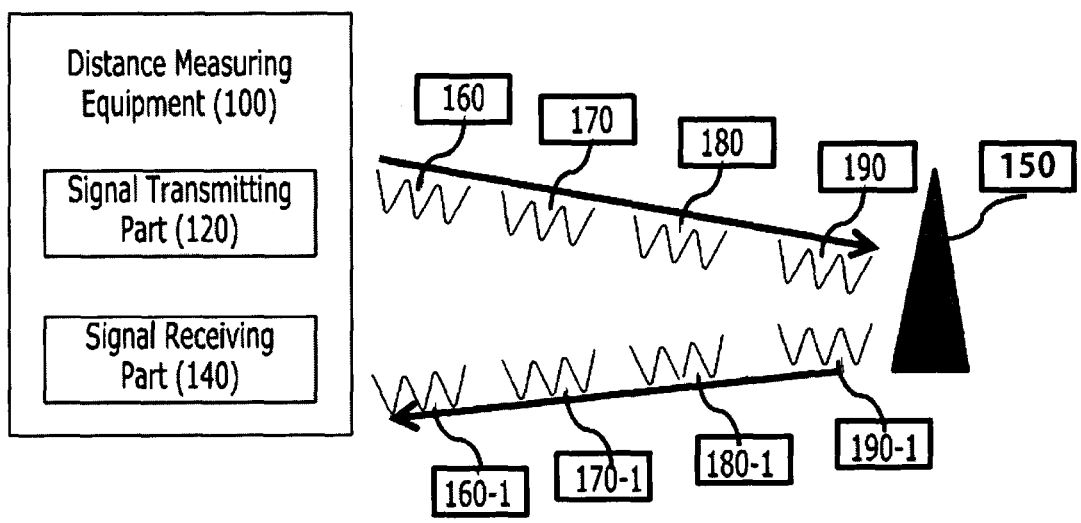
FIG. 1 is a conceptual diagram which shows a distance measuring method according to the embodiment of the present invention.

FIG. 1 is a conceptual diagram which shows a distance measuring method according to the embodiment of the present invention.

In reference to FIG. 1, a signal transmitting part (120) of a distance measuring equipment (100) can transmit multiple signals (160, 170, 180, 190) to a target of measuring (150) at regular intervals. The multiple signals (160, 170, 180, 190) may be optical signals generated from a light source. From now on, the embodiment of the present invention illustrates a method for measuring the distance between the distance measuring equipment (100) and the a target of measuring (150) based on optical signals (160-1, 170-1, 180-1, 190-1) which are received by a signal receiving part (140) when 4 optical signals (160, 170, 180, 190) are transmitted from the signal transmitting part (120) in order and reflected from the target of measuring (150). The number of optical signals (160, 170, 180, 190), 4, is a random number and other number than 4 of optical signals which are transmitted in order may be included in the scope of the right of the present invention.

In addition, the embodiment of the present invention receives the information of the optical signals (160-1, 170-1, 180-1, 190-1) reflected at 4 phases of 0 degree, 90 degrees, 180 degrees, and 270 degrees, and since these 4 phases are randomly selected, optical signals may be received in other phases and such embodiments are also included in the scope of the right of the present invention.

It is also possible that multiple signals (160, 170, 180, 190) are transmitted and received by the signal receiving part (140) by operating the shutter based on different phases for the signals (160-1, 170-1, 180-1, 190-1) reflected from the target of measuring (150). The signal receiving part (140) may calculate the phase difference between transmitting and receiving signals based on the signals received at different phases. The calculated phase difference between transmitting and receiving signals can be used to calculate the distance between the target of measuring (150) and the distance measuring equipment (100).

The method by which multiple signals can be transmitted, as illustrated in the present invention, may have the same effect as such a method that calculates the phase difference between transmitting and receiving signals based on the signal by phase obtained through multiple openings and closings of the shutter at one cycle wavelength for one signal. That is, through a low-speed operation of the shutter, without the need to implement a high-speed operation of the shutter so that the shutter may operate multiple times at one cycle wavelength, the phase difference between transmitting and receiving signals may be calculated based on the signal information calculated at multiple phases.

From now on, the embodiment of the present invention illustrates a method for calculating receiving signal information at every phase based on the opening and closing of the shutter at the signal receiving part when multiple transmitting signals (Signal 1, Signal 2, Signal 3, Signal 4) are transmitted from the signal transmitting part and reflected.

Figure 2:
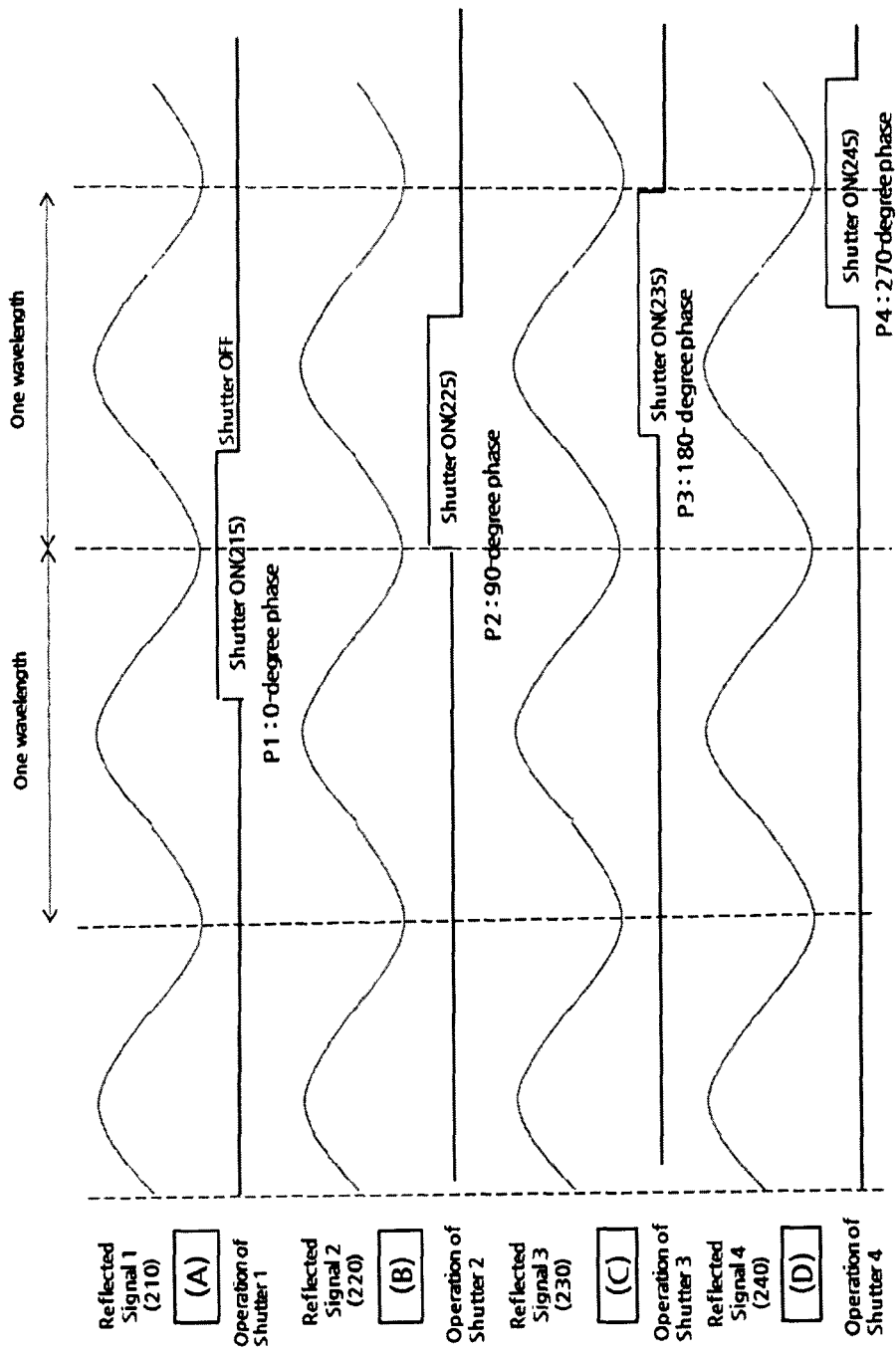
FIG. 2 is a conceptual diagram which shows a distance measuring method according to the embodiment of the present invention.

FIG. 2 is a conceptual diagram which shows a distance measuring method according to the embodiment of the present invention.

In reference to (A) in FIG. 2, the signal transmitting part may transmit Signal 1 of a frequency to the target of measuring at Time 1. The signal transmitted to the target of measuring may be reflected from the target of measuring and return to the signal receiving part. (A) in FIG. 2 indicates a signal (210) when Signal 1 is reflected from the target of measuring and input to the signal receiving part.

The signal receiving part may perform the operation of Shutter 1 (215) at a certain time based on a certain phase of the received signal and receive Signal 1 (210) reflected from the target of measuring. The signal calculated based on a certain phase may be used to calculate the phase difference between transmitting and receiving signals. The distance between the distance measuring equipment and the target of measuring can be calculated based on the phase difference between receiving signal reflected from the target of measuring and transmitting signal from the signal transmitting part.

Figure 3:
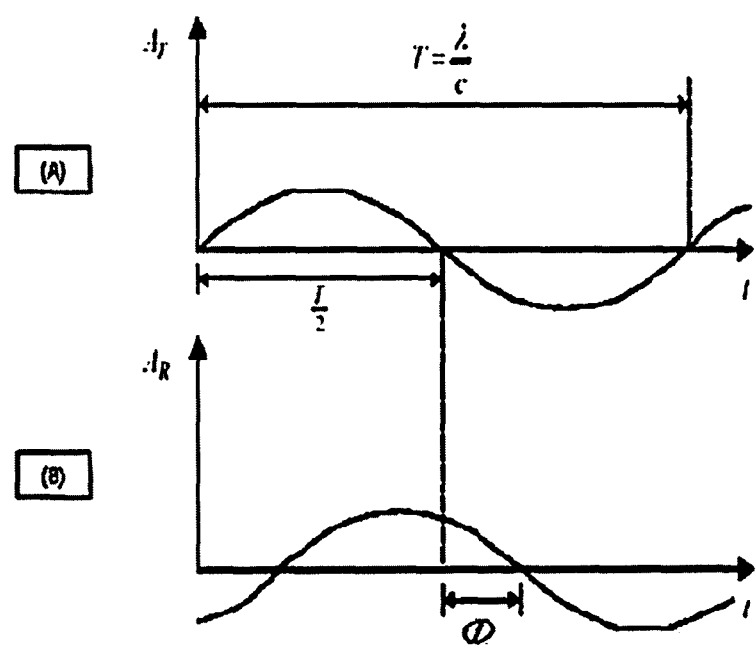
FIG. 3 is a conceptual diagram which shows a distance measuring method based on the phase difference between transmitting and receiving signals according to the present invention.

FIG. 3 is a conceptual diagram which shows a distance measuring method based on the phase difference between transmitting and receiving signals according to the present invention.

In reference to FIG. 3, (A) in FIG. 3 indicates the strength of transmitting signal over time and (B) indicates the strength of receiving signal over time, where T is the cycle of wavelength and c is the speed of a light source. There is the phase difference of between (A) and (B) in FIG. 3 and based on this phase difference, the distance Φ between the distance measuring equipment and the target of measuring can be measured. Equation 1 expresses turnaround time.

$$t_L = \frac{\phi}{2\pi f} \qquad \langle\text{Equation 1}\rangle$$

$t_L$ of Equation 1 is a variable indicating turnaround time. The turnaround time of signal can be calculated using Φ, the phase difference between transmitting signal and receiving signal reflected from the target of measuring, and f, the frequency of signal. When we multiply the turnaround time found from Equation 1 by the speed of signal (e.g., if the signal is light, the speed of light), the turnaround distance of signal operation can be determined and when we divide it by 2, the distance between the distance measuring equipment and the target measuring point can be determined. Equation 2 expresses the distance between the distance measuring equipment and the target measuring point.

$$R = \frac{c}{4\pi f}\phi \qquad \langle\text{Equation 2}\rangle$$

In Equation 2, R is a variable indicating the distance between the distance measuring equipment and the target measuring point. The distance between the distance measuring equipment and the target measuring point can also be determined based on the phase difference between the light once generated from a light source and transmitted to the target of measuring and the reflected signal. For more accurate measuring of distance, the size of signal can be measured several times within one cycle of the received signal to calculate the exact phase difference.

Again in reference to FIG. 2, in the embodiment of the present invention, the phase difference between transmitting signal and receiving signal can be determined by receiving multiple signals at different phases by turning on/off the shutter at the signal receiving part.

(B), (C), and (D) in FIG. 2 are conceptual diagrams which show reflected signals so as to calculate the phase difference based on multiple signals according to the embodiment of the present invention.

For example, the signal transmitting part may transmit again Signal 2 of the same properties (e.g. amplitude, frequency) as Signal 1 at Time 2 in certain time after Time 1 to the target of measuring. Signal 2 (220) which is reflected from the target of measuring and received by the signal receiving part may receive the information for the signal through the operation of Shutter 2 (225) at other phase than the phase at which Signal 1 is measured. For example, if the signal information of Signal 1 (210) is received which is reflected by the operation of Shutter 1 (215) at 0 degree of phase for the reflected Signal 1 (210), the signal information of the reflected Signal 2 (220) can be received by the operation of Shutter 2 (225) at 90 degrees of phase.

Likewise, the signal generating part may generate Signal 3 at Time 3 after Time 2 and Signal 4 at Time 4 after Time 3. (C) in FIG. 1 shows that Signal 3 receives the Signal 3 reflected from the target of measuring (230) by the operation of Shutter 3 (235) at 180 degrees of phase and (D) in FIG. 1 shows that Signal 4 receives the Signal 4 reflected from the target of measuring (24) by the operation of Shutter 4 (245).

Likewise, the phase difference can be determined using Equation 3 based on the strength of Signal 1, Signal 2, Signal 3, and Signal 4 measured at different phases.

$$\phi = \arctan\left(\frac{A_1 - A_3}{A_2 - A_4}\right) \qquad \langle\text{Equation 3}\rangle$$

In reference to Equation 3, the phase difference can be determined based on the value of arc tangent using the strength difference between Signal 1 (A1) and Signal 3 (A3) as the numerator and the strength difference between Signal 2 (A2) and Signal 4 (S) as the denominator.

In this case, the strength of detected signal may be that of the signal when the position of shutter is moved from on to off, when the shutter is turned on, or when it is applicable for the half of the time when the position of the shutter is moved from on to off. But, since the strength of Signal 1 or Signal 4 needs to be measured, if the strength of Signal 1 was measured when the position of the shutter was moved from on to off, the strength of Signal 2, 3, and 4 also should be measured for the same condition.

The calculated phase difference may be input to the abovementioned Equation 2 to measure the distance between the distance measuring device and the target of measuring.

According to another embodiment of the present invention, the distance between the distance measuring device and the target of measuring can be determined based on the operation of the shutter by phase for multiple signals even when the signal transmitted from the signal transmitting part is square wave or pulse.

Figure 4:
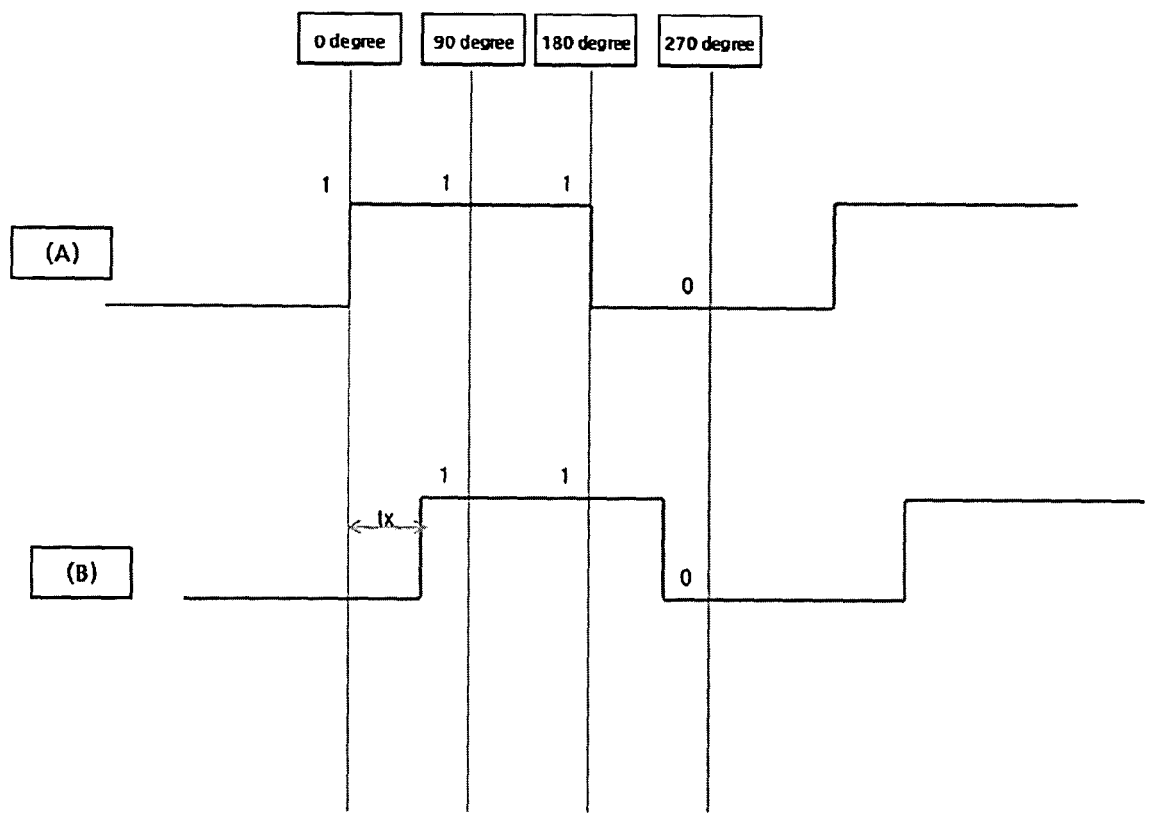
FIG. 4 is a conceptual diagram which shows a distance measuring method using square wave according to the embodiment of the present invention.

FIG. 4 is a conceptual diagram which shows a distance measuring method using square wave according to the embodiment of the present invention.

In reference to FIG. 4, (A) in FIG. 4 indicates the waveform of transmitting signal. If we assume the wavelength of transmitting signal as '1' when there is pulse or square wave and '0' when there is no pulse or square wave based on 0 degree, 90 degrees, 180 degrees, and 270 degrees and '1' for edge, the measuring value of each phase could be '1110'.

(B) in FIG. 4 indicates the waveform of receiving signal. If receiving signal has been received with the difference of tx against transmitting signal (or reference signal), the measuring value could be '0110' based on 0 degree, 90 degrees, 180 degrees, and 270 degrees. That is, if transmitting signal is received between wavelengths of phase ranging 0 degree to 90 degrees against reference signal, all of the measuring values could be '0110'. That is, measuring distance using pulse or square wave can be performed based on the changes of amplitude of the pulse or square wave measured based on 4 phases.

In this case, the strength of signal for Equation 3 is that of square wave or pulse which may be understood to have A1=0, A2=1, A3=1, A4=0.

For the strength of phase signal of the present invention, as abovementioned, the size of amplitude of the reflected signal measured on same time as the time when the position of the shutter is moved from on to off can be measured when the signal is sine wave. If the signal is pulse or square wave, the size of the reflected pulse or square wave can be measured as the size of amplitude.

Figure 5:
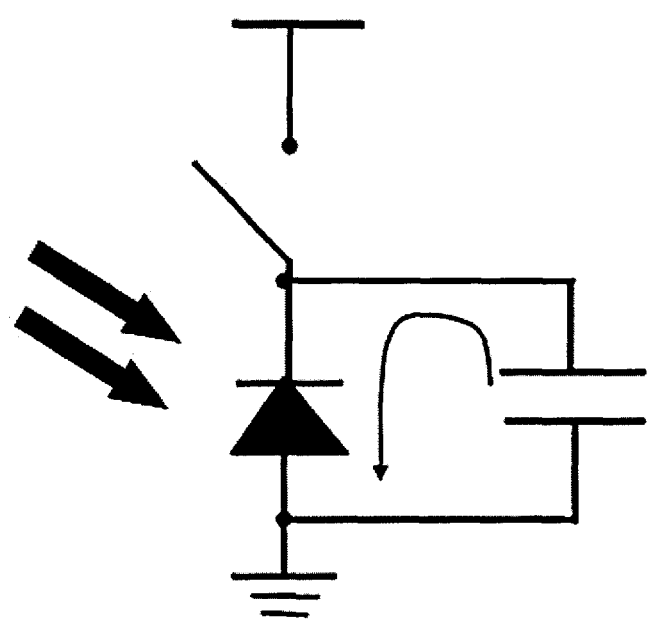
FIG. 5 is a circuit diagram of APS which measures the quantity of light charged in the photocell according to the embodiment of the present invention.

In addition, regardless of whether the signal is sine wave or square wave, the phase difference may be determined using the quantity of light charged in the photocell of a camera using an APS (Active Pixel Sensor) as shown in FIG. 5.

Figure 6:
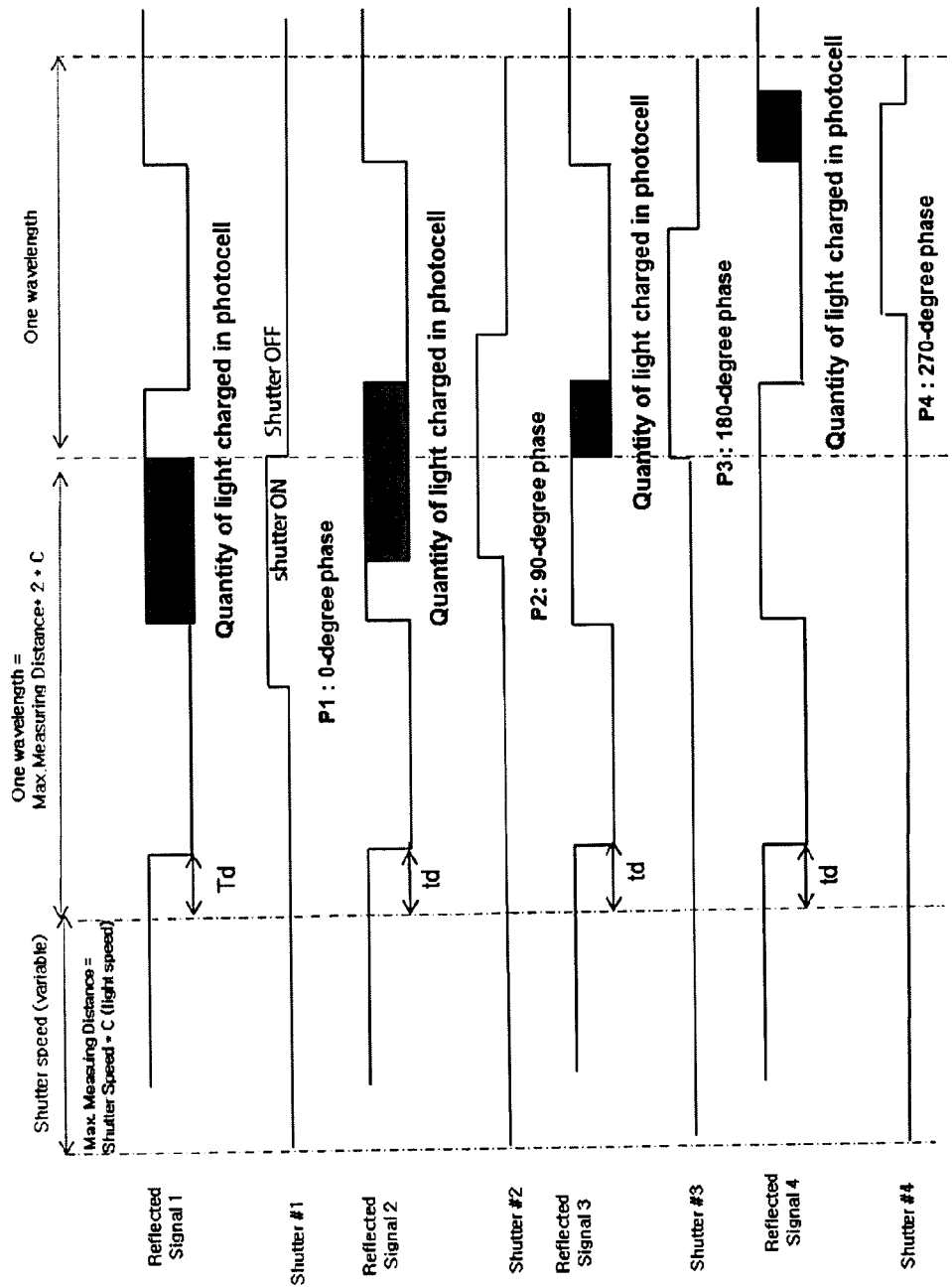
FIG. 6 is a conceptual diagram which shows a distance measuring method using the quantity of light charged in the photocell according to the embodiment of the present invention.

FIG. 6 is another example of a method for measuring the strength of phase signal in the embodiment of the present invention.

The quantity of light can be charged in the photocell when the shutter is positioned on. For sine wave, it is charged (or reversely charged) at phase; for square wave, it is only charged when phase is 1.

When the maximum quantity of light is charged in the photocell, the value is 4. If the charged quantity of light is just three quarters of the case when the shutter is positioned on for the reflected Signal 1 or 2, the value is 3. If the charged quantity of light is just one quarter of the case when the shutter is positioned on for the reflected Signal 3 or 4, the value is 1.

Figure 7:
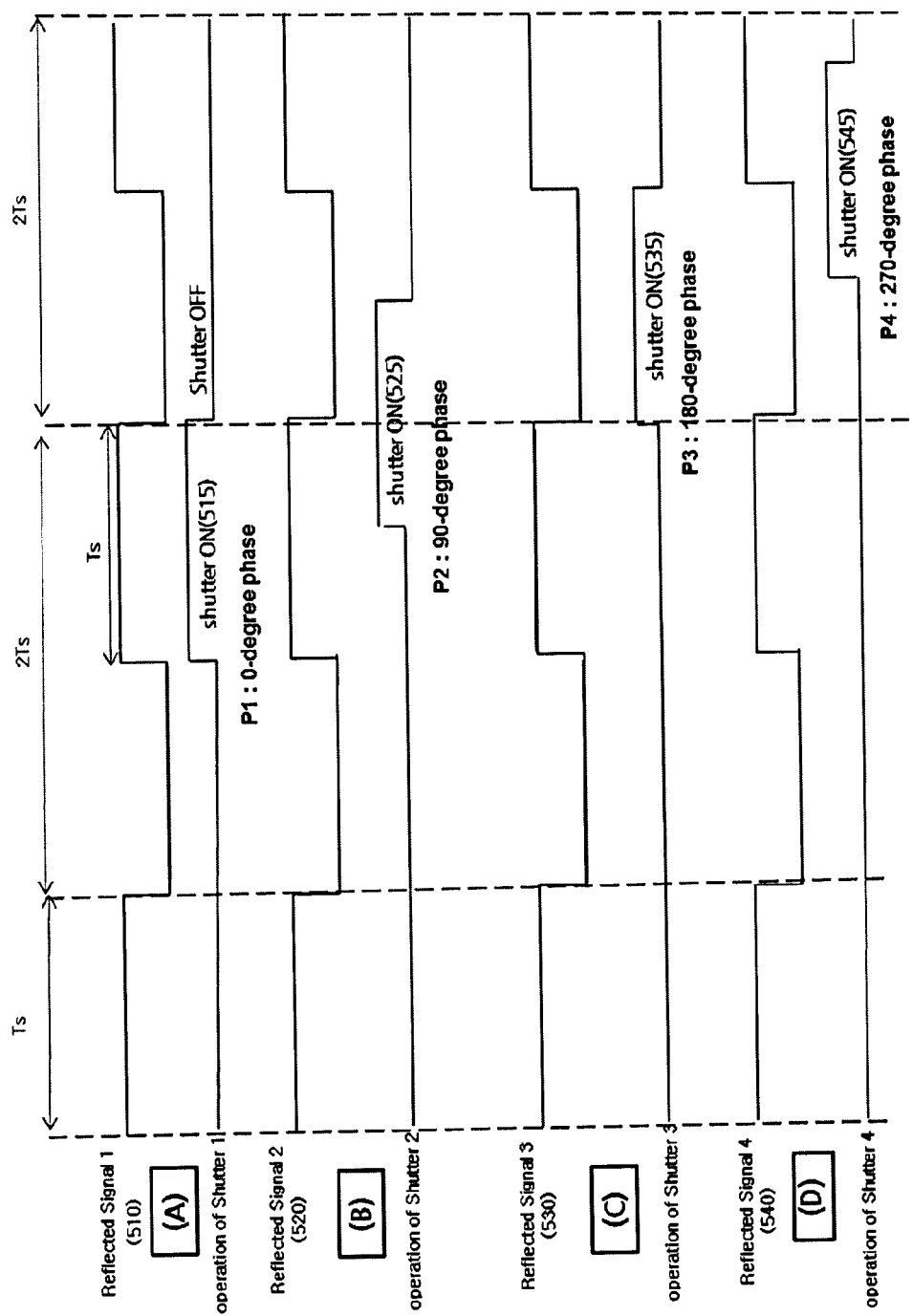
FIG. 7 is a conceptual diagram which shows a method to measure the distance between a measuring unit and a target of measurement according to the embodiment of the present invention. (Ts)

FIG. 7 is a conceptual diagram which shows a method to measure the distance between a measuring unit and a target of measurement according to the embodiment of the present invention.

In reference to FIG. 7, unlike FIG. 1, the signal generated from the measuring part may be of pulse or square wave signal, not of sine wave or sinusoidal curve. Pulse or square wave signal is easier to generate and synchronize shutter speed and waveform than sine wave or sinusoidal signal.

In FIG. 7, assuming the shutter operating time is Ts when the shutter is closed then opened, the signal of 2 Ts cycle can be generated and transmitted to the target of measuring from the distance measuring equipment. The amplitude of the generated signal may be A for the cycle of Ts (half wavelength) and 0 for the rest cycle of Ts (the remaining half of wavelength).

(A) in FIG. 7 is a conceptual diagram which shows a method for the Signal 1 (510) generated at Time 1 and reflected from the target of measuring to receive by the operation of Shutter 1 (515). The shutter of the signal receiving part may receive the Signal 1 (510) reflected at 0 degree of phase by the operation of Shutter 1 (515) and be closed. That is, the signal receiving part which receives the reflected Signal 1 (510) may receive the Signal 1 (510) reflected at phase 0.

(B) in FIG. 7 is a conceptual diagram which shows a method for the Signal 2 (520) generated at Time 2 and reflected from the target of measuring to receive. Signal 2 may be generated in a certain time after Signal 1 is generated. The shutter of the signal receiving part may operate so that the reflected Signal 2 (520) may be received at 90 degrees of phase.

Likewise (C) and (D) in FIG. 3, (C) in FIG. 7 shows that Signal 3 generated at Time 3 receives the Signal 3 (530) reflected from the target of measuring at 180 degrees of phase by the operation of Shutter 3 (535). (D) in FIG. 7 shows that Signal 4 generated at Time 4 receives the Signal 4 (540) reflected from the target of measuring at 270 degrees of phase by the operation of Shutter 4 (545).

By using the abovementioned methods, the changes in signals can be measured based on each phase likewise such a case that the distance between the distance measuring device and the target of measuring is measured based on 4 phases with one signal without the need to additionally increase shutter speed.

FIG. 7, as an example, shows a method that receives each of the signals based on 4 phases even when one wavelength of signal get longer.

Figure 8:
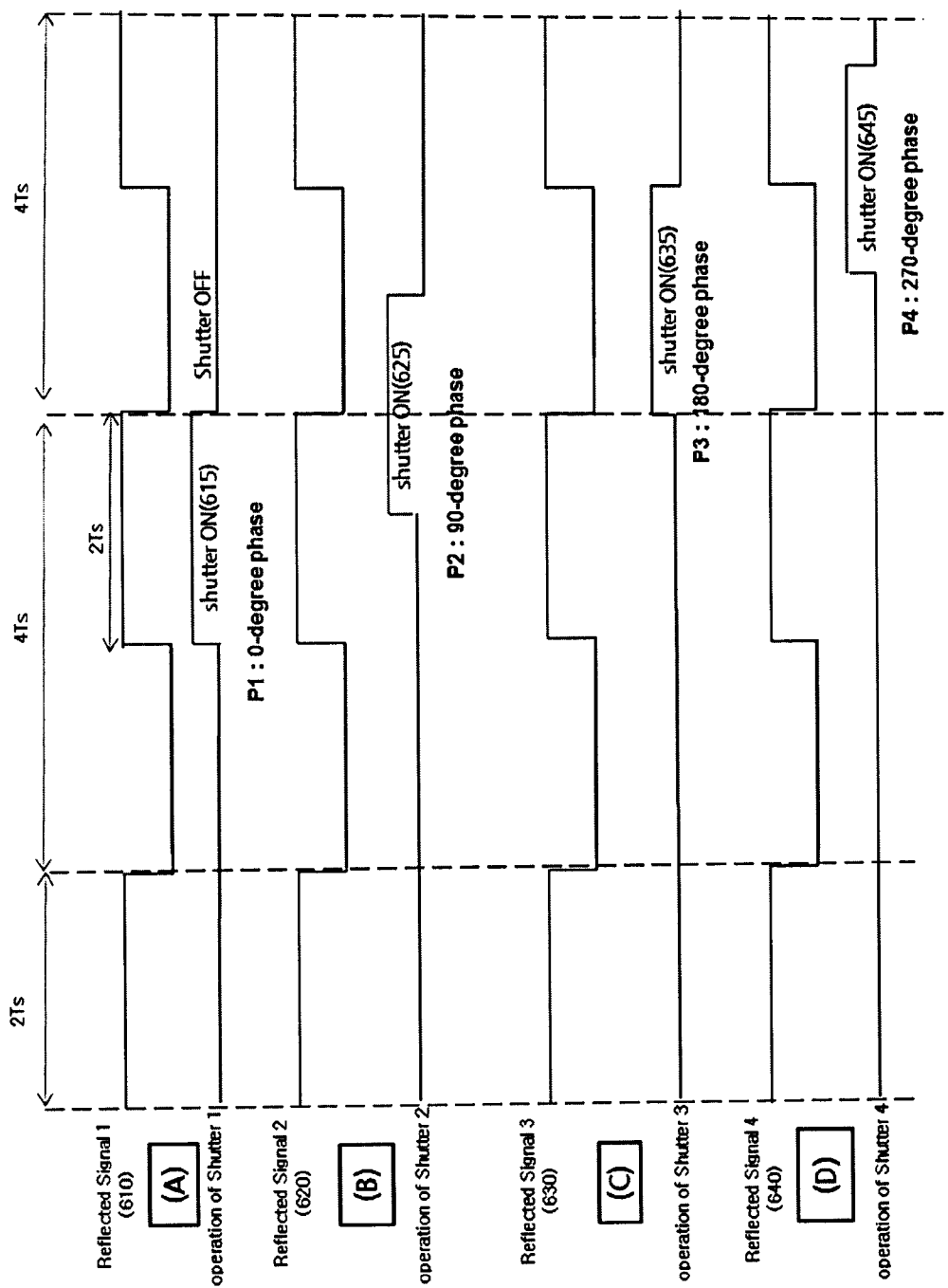
FIG. 8 is a conceptual diagram which shows a method to measure the distance between a measuring unit and a target of measurement according to the embodiment of the present invention. (2 Ts)

FIG. 8 is a conceptual diagram which shows a method to measure the distance between a measuring unit and a target of measurement according to the embodiment of the present invention.

FIG. 8 shows a case where the length of the wavelength of signal is twice and shutter speed is ½ comparing with FIG. 3. If signal wavelength increases, shutter speed decreases and the strength of signal is half of that of FIG. 5. The signal transmitting part can transmit signals which have wavelength of varied lengths to the target of measuring.

In FIG. 8, likewise FIG. 7, the signal transmitting part generates signals at Time 1, Time 2, Time 3, and Time 4 and transmits them to the target of measuring and the signal receiving part can receive the Signal 1 (610), the Signal 2 (620), the Signal 3 (630), and the Signal 4 (640) reflected from the target of measuring at 0 degree, 90 degrees, 180 degrees, and 270 degrees of phase, respectively, by the operation of the shutter.

Figure 9:
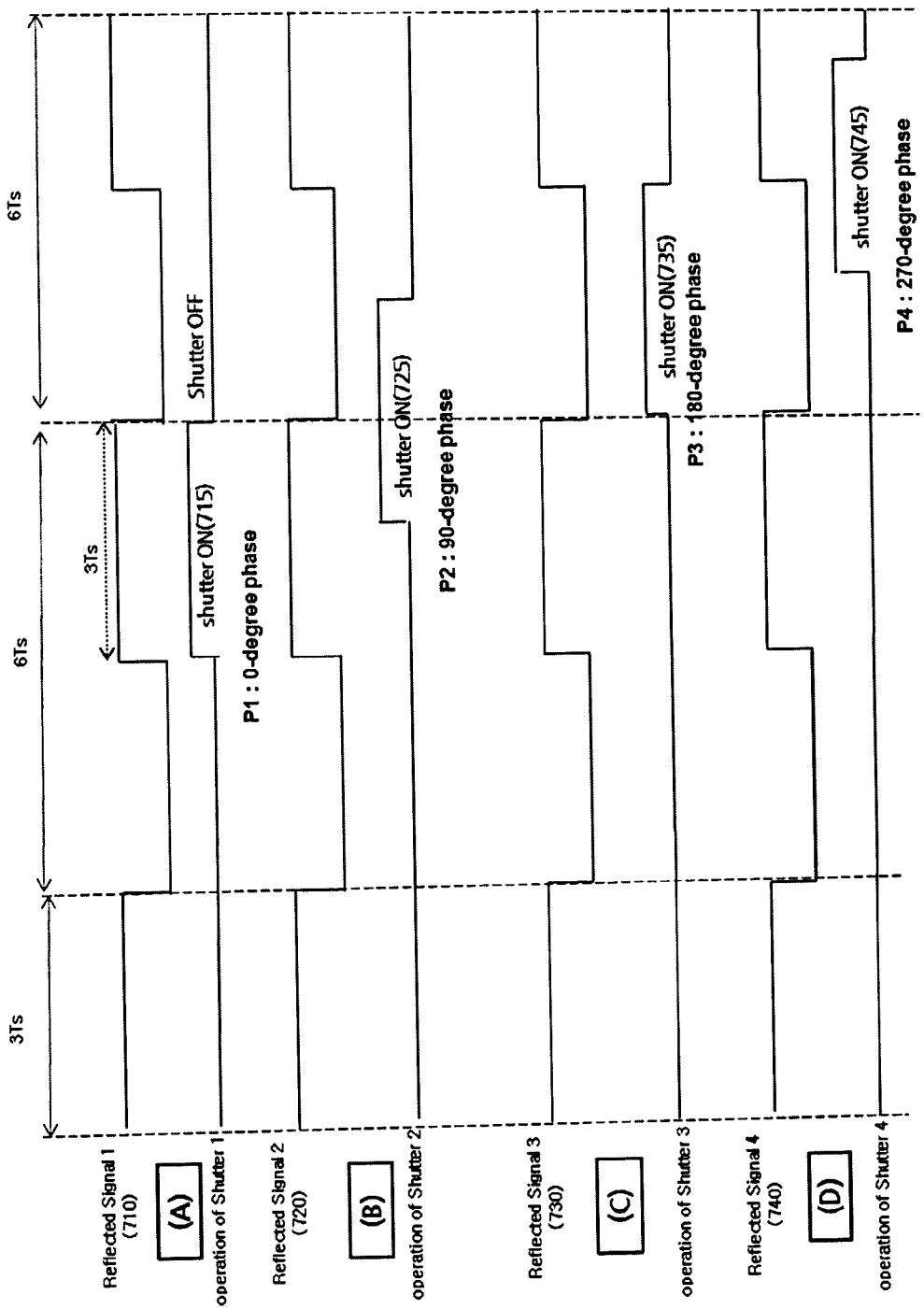
FIG. 9 is a conceptual diagram which shows a method to measure the distance between a measuring unit and a target of measurement according to the embodiment of the present invention. (3 Ts)

FIG. 9 is a conceptual diagram which shows a method to measure the distance between a measuring unit and a target of measurement according to the embodiment of the present invention.

In reference to FIG. 9, the length of wavelength is thrice and shutter speed is one third of that of FIG. 7.

Likewise FIGS. 7 and 8, (A) and (D) in FIG. 9 shows that the Signal 1 (710), the Signal 2 (720), the Signal 3 (730), and the Signal 4 (740) reflected from the target of measuring at 0 degree, 90 degrees, 180 degrees, and 270 degrees of phase, respectively.

Figure 10:
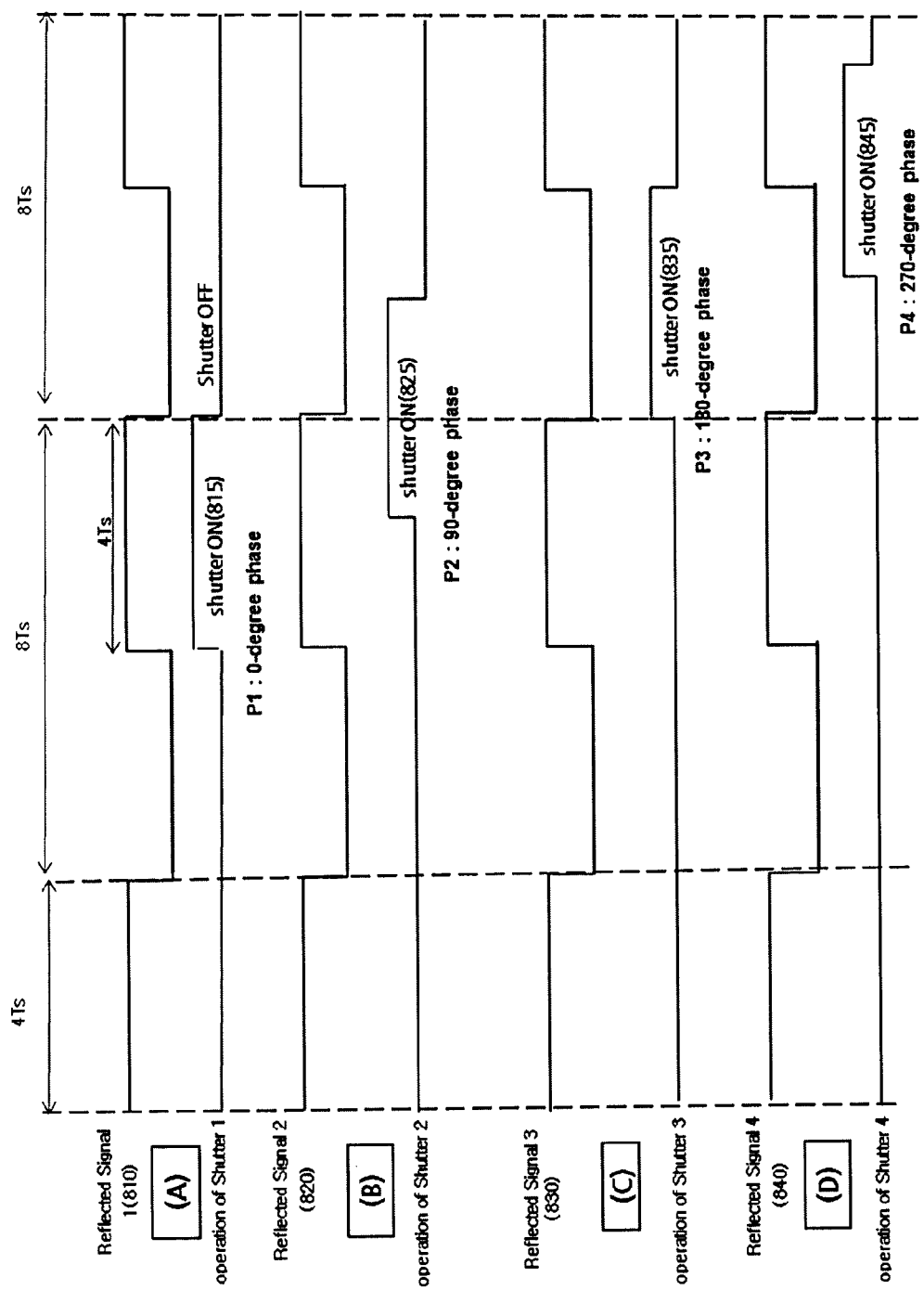
FIG. 10 is a conceptual diagram which shows a method to measure the distance between a measuring unit and a target of measurement according to the embodiment of the present invention. (4 Ts)

FIG. 10 is a conceptual diagram which shows a method to measure the distance between a measuring unit and a target of measurement according to the embodiment of the present invention.

In reference to FIG. 10, the length of wavelength is four times and shutter speed is one fourth of that of FIG. 7.

In the abovementioned method, shutter speed and signal wavelength can be changed and according to varied shutter speed and signal wavelength, the signal receiving part may receive the generated signal and calculate the phase difference between transmitting and receiving signals and the distance between the signal transmitting part and the target of measuring in terms of phase difference.

Figure 11:
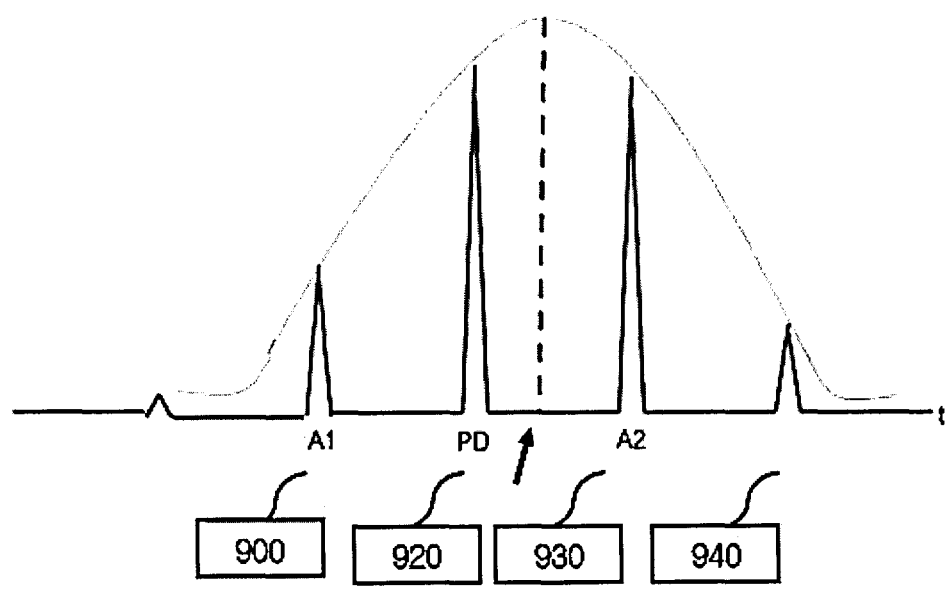
FIG. 11 is a conceptual diagram which shows a distance measuring method according to the embodiment of the present invention.

FIG. 11 is a conceptual diagram which shows a distance measuring method according to the embodiment of the present invention.

FIG. 11 explains a method for calculating phase difference by measuring the value and cycle of light intensity by operating the actuating signal of the shutter in the form of impulse or square wave with the amplitude corresponding to that of sine wave or sinusoidal wave, unlike the abovementioned method, and measuring the value and cycle of light intensity.

In reference to FIG. 11, when impulse or square wave (900, 920, 930, 940) with the amplitude corresponding to that of sine wave or sinusoidal wave is input as the actuating signal to operate the shutter, the reflected signal can be received on the cycle of inputting the impulse or square wave signal (900, 920, 930, 940). The strength of the received signal has the form of sine wave or sinusoidal wave and the phase difference between transmitting signal and receiving signal can be determined based on the value of sine wave or sinusoidal wave.

Figure 12:
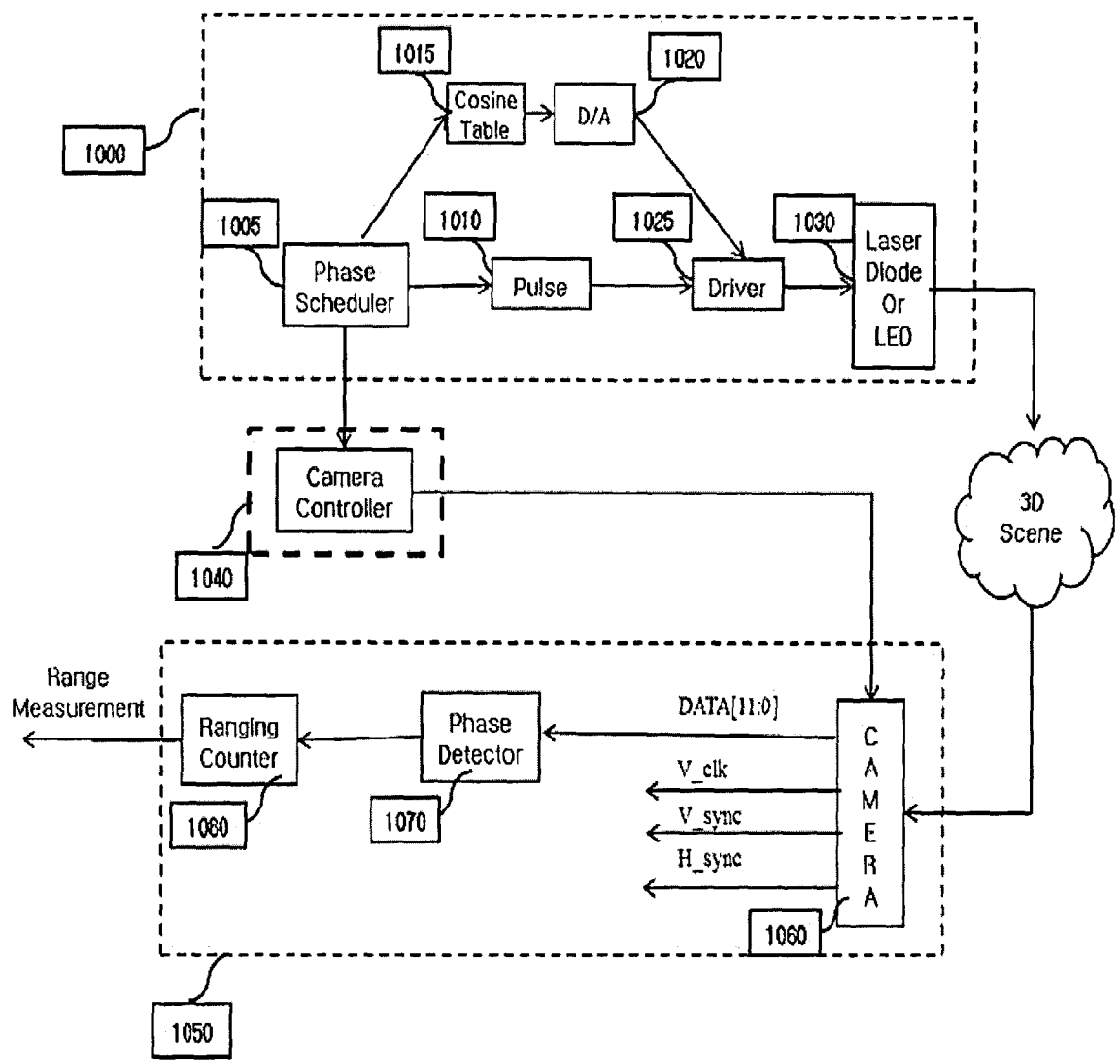
FIG. 12 is a conceptual diagram which shows a distance measuring method according to the embodiment of the present invention.

FIG. 12 is a conceptual diagram which shows a distance measuring method according to the embodiment of the present invention.

FIG. 12 shows a distance measuring equipment which measures distances using a method that generates the abovementioned sine wave or sinusoidal wave and/or pulse or square wave signal and transmits them to the target of measuring and receives the reflected signal.

The separated component in the embodiment of the present invention is shown separated functionally. One component may be divided into multiple components or multiple components may be embodied in one component and included in this embodiment or the scope of a right of the present invention.

The distance measuring device may include a control part (1040), a signal transmitting part (1000), and a signal receiving part (1050).

Some of the components included in the control part (1040), the signal transmitting part (1000), the signal receiving part (1050) may be embodied in FPGA (field-programmable gate array).

The signal transmitting part (1000) may include a phase scheduler (1005), a cosine table (1015), a pulse or square wave generator (1010), a D/A converter (1020), a driving circuit (1025), a light source (1030).

The phase scheduler (1005) may schedule the phase of the generated signal and provide reference signal to the signal receiving part. The signal receiving part (1050) may receive transmitting signal at multiple phases based on the reference signal provided by the phase scheduler 91005).

The cosine table (1015) and the D/A converter (1020) may be embodied to determine the amplitude value according to the phase of signal and generate sine wave or sinusoidal signal. If the abovementioned pulse or square wave signal is used without using sine wave or sinusoidal signal, pulse or square wave signal may be generated using the pulse or square wave generator (1010).

The cosine table (1015), the D/A converter (1020), and the pulse or square wave generator (1010) may be included in one signal transmitting part (1000) and optionally used depending upon the signal generated by the signal transmitting part (1000). However, if one signal transmitting part (1000) generates sine wave or sinusoidal signal only, the pulse or square wave generator (1010) may not be included and if the signal transmitting part (1000) generates pulse or square wave signal only, the cosine table (1015) and the D/A converter (1020) may not be included.

The driver circuit (1025) may generate analog signals to drive the light source based on the digital signal generated at the previous circuit end.

A light source (1030) is a part generating light to be transmitted to the target of measuring and may be embodied in various forms. For example, in case of the use of laser source, such laser sources that have particular wavelengths from 250 nm to 11 □m or wavelength-swept source may be embodied. In addition, for the light source (1030), semiconductor laser diodes such as small and low power LEDs (light emitting diodes) or LDs (laser diodes) may be usually used.

At the light source (1030), as abovementioned, multiple signals of same properties may be transmitted to the target of measuring. The multiple signals of same properties may include Signal 1, Signal 2, Signal 3, and Signal 4 and each of the signals may be transmitted in order to the target of measuring at regular intervals.

The control part (1040) may be embodied to control the signal receiving part (1050) based on the information generated by the signal transmitting part (1000). For example, the control part (1040) may control the opening and closing of the shutter of a camera (1060) mounted at the signal receiving part based on the transmitting signal generated by the signal transmitting part. In addition, the control part (1040) may generate signals which control the operation performed by the signal transmitting part (1000) and the signal receiving part (1050).

The signal receiving part (1050) may include the camera (1060), a phase detector (1070), and a ranging counter (1080).

Since being equipped with the shutter, the camera (1060) may receive the signal reflected from the target of measuring. The shutter mounted on the camera (1060) may open or close at a particular phase point of the received signal based on the speed of a particular shutter. As abovementioned, the shutter of the camera (1060) may receive multiple signals of same properties at a particular phase and calculate the phase difference between transmitting signal and receiving signal. The camera (1060) may receive the received signal at a particular phase based on the information of the received reference signal.

The phase detector (1070) may be embodied to detect the phase of multiple signals received by the camera (1060).

The distance detector (1080) may be embodied to calculate the phase difference between receiving signal and transmitting signal detected by the phase detector (1070) using signal comparison information such as timestamp. The phase detector (1070) may detect the changes of phase between transmitting signal and receiving signal and calculate the distance between the distance measuring equipment and the target of measuring based on signal information calculated by phase based on multiple signals according to the embodiment of the present invention.

In FIG. 12, for convenience' sake, it was assumed that the signal transmitting part (1000), the control part (1040), and the signal receiving part (1050) are contained in one equipment but they may be embodied in a separate configuration.

Figure 13:
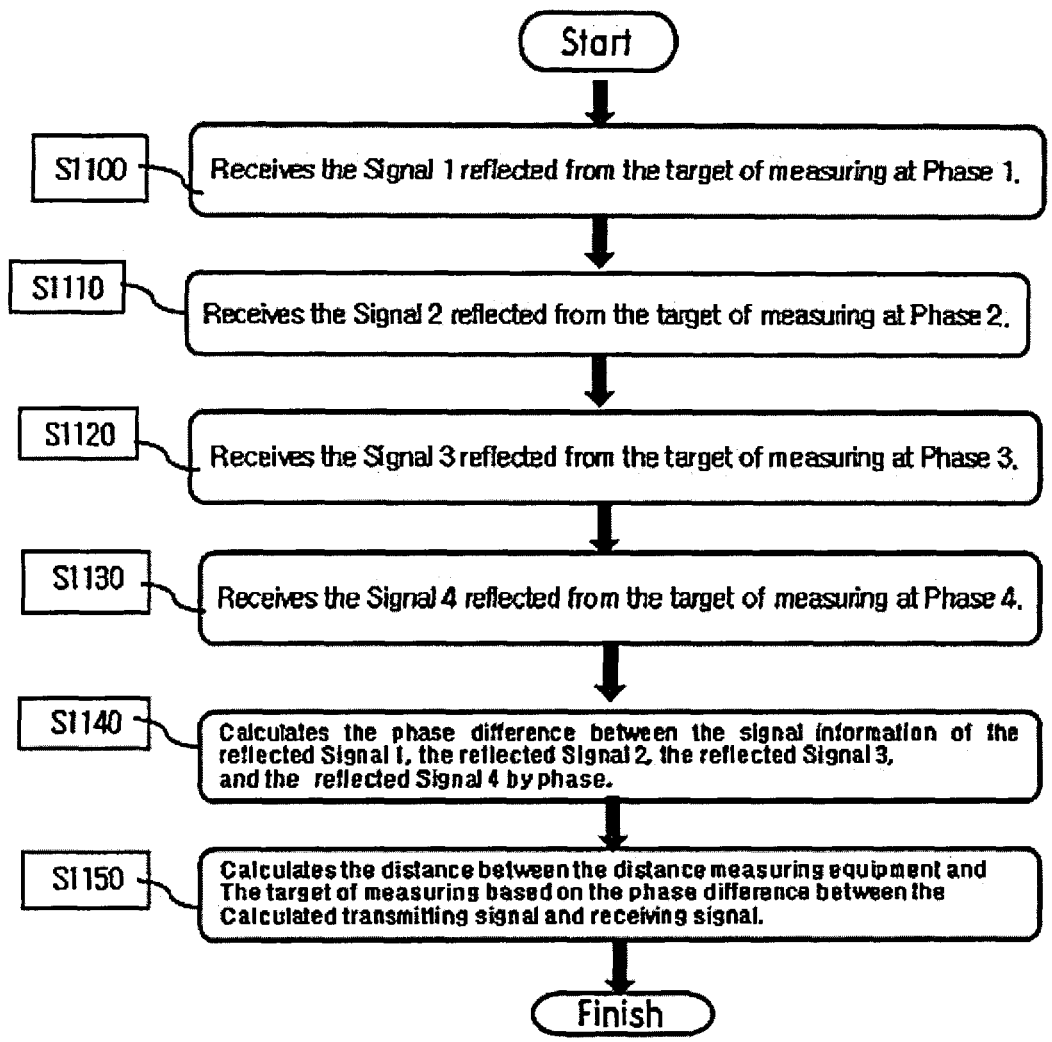
FIG. 13 is a flowchart which shows a method for measuring the distance to a target of measurement according to the embodiment of the present invention.

FIG. 13 is a flowchart which shows a method for measuring the distance to a target of measurement according to the embodiment of the present invention.

In reference to FIG. 13, Signal 1 reflected from the target of measuring is received at Phase 1 (the stage of S1100).

The signal receiving part may receive Signal 1 which is generated at Time 1 by the light source of the signal transmitting part and reflected by the target of measuring at Phase 1 (e.g. 0 degree). The signal receiving part may receive the signal by opening the shutter at Phase 1 of the received Signal 1.

Signal 2 reflected from the target of measuring is received at Phase 2 (the stage of S1110.

The signal receiving part may receive Signal 2 which is generated at Time 2 by the light source of the signal transmitting part and reflected by the target of measuring at Phase 2. Considering the shutter speed, the signal transmitting part can transmit Signal 2 in a certain time after Signal 1 is generated. The signal receiving part may receive the signal by opening the shutter at Phase 2 of the received Signal 2.

The Signal 3 reflected by the target of measuring is received at Phase 3 (the stage of S1120).

The signal receiving part may receive Signal 3 generated at Time 3 by the light source of the signal transmitting part and reflected by the target of measuring. Signal 3 may be transmitted in a certain time after Signal 2 is generated considering the shutter speed. The signal receiving part may receive the signal by opening the shutter at Phase 3 of the received Signal 3.

The Signal 4 reflected by the target of measuring is received at Phase 4 (the stage of S1130).

The signal receiving part may receive Signal 4 generated at Time 4 by the light source of the signal transmitting part and reflected by the target of measuring. Signal 4 may be transmitted in a certain time after Signal 3 is generated considering the shutter speed. The signal receiving part may receive the signal by opening the shutter at Phase 4 of the received Signal 4.

The phase difference can be calculated based on the signal information by phase of the received and reflected Signal 1, the reflected Signal 2, the reflected Signal 3, and the reflected Signal 4 (the stage of S1140).

The Signal 1, Signal 2, Signal 3, and the Signal 3 received at each phase can be used to calculate the phase difference between transmitting signal and receiving signal by being processed as same as the signal information collected by the operation of the shutter at different phases for one cycle of signal. Various mathematical processing methods can be used as a method to calculate the phase difference between transmitting signal and receiving signal and are not limited to one embodiment of the present invention. For example, for sign wave or sinusoidal curve, the phase difference between transmitting signal and receiving signal can be calculated based on the amplitude value by phase of each signal, and for pulse or square wave function, the phase value calculated by signal can be used as four bits to calculate the phase difference.

Based on the calculated phase difference between transmitting signal and receiving signal, the distance between the distance measuring equipment and the target of measuring can be calculated (the stage of S1150).

Based on the phase difference between transmitting signal and receiving signal calculated in the stage of S1130, the distance measuring equipment and the target of measuring can be calculated. Based on the phase difference between receiving signals, the distance measuring equipment and the target of measuring can be calculated using such a formula as Equation 2.

Figure 14:
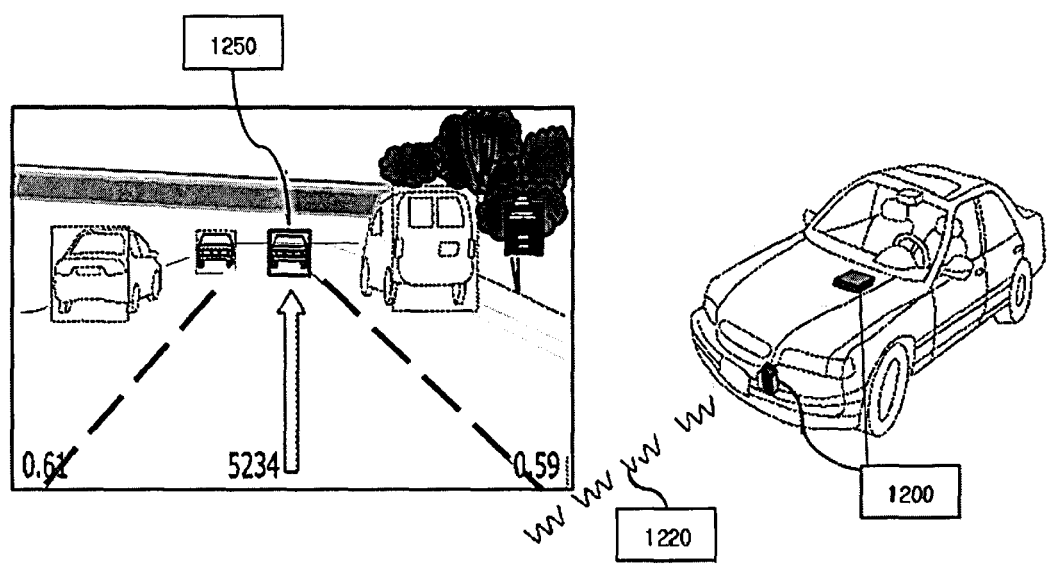
FIG. 14 is a conceptual diagram which shows a method for measuring the distance between cars based on the method for measuring the distance to a target of measurement according to the embodiment of the present invention.

FIG. 14 is a conceptual diagram which shows a method for measuring the distance between cars based on the method for measuring the distance to a target of measurement according to the embodiment of the present invention.

FIG. 14 illustrates a method for recognizing an obstacle which is fixed or moved by equipping with a short-distance LIDAR FPA (focal plane array) sensor (1200) embodied by the abovementioned methods in FIGS. 1 through 13 in a car.

A system for a driver traveling on the road using the LIDAR sensor (1200) according to the present invention to recognize the distance between his own car and other car on the road.

The LIDAR sensor (1200) may transmit multiple signals (1220) to the target of measuring (1250) at regular intervals and receive the multiple signals (1220) with a phase difference to measure the distance to the target of measuring (1250). The signal used to measure the distance may be modulated into various frequencies and amplitudes and transmitted to the target of measuring (1250).

The control part of a car may monitor vehicle-to-vehicle distances detected by the LIDAR sensor (1200) and if a risk of collision is found based on the information monitored, it may operate an alarm system or control the behavior of the car.

FIG. 14 is an embodiment with application of a LIDAR sensor according to the embodiment of the present invention and may be used for not only cars but also such a field that LIDAR sensors may be applied such as various transportation means and distance measuring equipment.

Apart from the abovementioned embodiments, any experienced employee of the applicable technical field may understand that the present invention may be modified and altered within the range of not deviating from the ideas and areas of the present invention stated in the scope of a request for a patent.

What is claimed is:

1. A distance measuring method comprising:
    operating a shutter of measuring equipment to receive multiple optical signals at different phases, the multiple optical signals being of a same frequency and a same amplitude, each of said multiple optical signals being reflected from a target of measurement;
    calculating a phase difference between transmitted signals, that correspond to said multiple optical signals, and said multiple optical signals received at said different phases; and
    calculating a distance between said target of measurement and the measuring equipment based on said phase difference.

2. The distance measuring method using phase difference of optical signals of claim 1, wherein the shutter includes first, second, third and fourth shutters, the operating the shutter of the measuring equipment to receive the multiple optical signals includes
    receiving a first signal of the multiple optical signals, reflected from said target of measurement, through an operation of the first shutter at a first phase,
    receiving a second signal of the multiple optical signals, reflected from said target of measurement, through an operation of the second shutter at a second phase,
    receiving a third signal of the multiple optical signals, reflected from said target of measurement, through an operation of the third shutter at a third phase, and
    receiving a fourth signal of the multiple optical signals, reflected from said target of measurement, through an operation of the fourth shutter at a fourth phase.

3. The distance measuring method of claim 2, wherein calculating the phase difference includes
    calculating first amplitude information of the first signal received in said first phase,
    calculating second amplitude information of the second signal received in the second phase,
    calculating third amplitude information of the third signal received in the third phase,
    calculating fourth amplitude information of the fourth signal received in the fourth phase,
    calculating the phase difference between based on said first amplitude information, said second amplitude information, said third amplitude information, and said fourth amplitude information.

4. The distance measuring method of claim 2, wherein the first signal, the second signal, the third signal and the fourth signal are received in that stated order, and are sine wave signals, pulse signals, or square wave signals and the first phase, the second phase, the third phase, and the fourth phase, are 0 degree, 90 degrees, 180 degrees, and 270 degrees, respectively.

5. The distance measuring method of claim 2, wherein the calculating the phase difference includes
    calculating a first quantity of light, that is charged in a photocell, of said first signal received in the first phase,
    calculating a second quantity of light, that is charged in the photocell, of the second signal received in the second phase,
    calculating a third quantity of light, that is charged in the photocell, of said third signal received in the third phase, calculating a fourth quantity of light, that is charged in the photocell, of the fourth signal received in the fourth phase, and calculating the phase difference based on the first, second, third and fourth quantities of the lights.

6. The distance measuring method of claim 1, wherein said distance measuring method includes transmitting said transmitted signals to said target of measurement in order, and said transmitted signals include a first signal, a second signal, a third signal, and a fourth signal and are transmitted in that stated order based on a shutter speed of the shutter.

7. A distance measuring equipment comprising:
a signal transmitter that transmits multiple optical transmitting signals, of a same frequency and a same amplitude, to a target of measurement such that the optical transmitting signals are reflected from the target of measurement to form multiple receiving signals;
a signal receiving part that receives said multiple receiving signals at different phases; and
a control part calculating a phase difference between the transmitting and receiving signals, and calculating a distance between said target of measurement and the distance measuring equipment based on said phase difference.

8. The distance measuring equipment of claim 7, wherein
the receiving signals include a first receiving signal, a second receiving signal, a third receiving signal and a fourth receiving signal,
the signal receiving part including a first shutter, a second shutter, a third shutter and a fourth shutter, and
said signal receiving part controls operation of the first-fourth shutters so that the signal receiving part
receives the first receiving signal, that is reflected from said target of measurement, through an operation of the first shutter at a first phase,
receives the second receiving signal, that is reflected from said target of measurement, through an operation of the second shutter at a second phase,
receives the third receiving signal, that is reflected from said target of measurement, through an operation of the third shutter at a third phase, and
receives the fourth receiving signal, that is reflected from said target of measurement, through an operation of the fourth shutter at a fourth phase.

9. The distance measuring equipment of claim 8, wherein said control part calculates a first amplitude information of said first receiving signal received in the first phase,
calculates a second amplitude information of said second receiving signal received at said second phase,
calculates a third amplitude information of said third receiving signal received at said third phase,
calculates a fourth the amplitude information of said fourth receiving signal received at said fourth phase, and
calculates the phase difference between the transmitting and receiving signals based on the first-fourth amplitude information.

10. The distance measuring equipment of claim 8, wherein the first receiving signal, the second receiving signal, the third receiving signal and the fourth receiving signal are received in that stated order, and are sine wave signals, pulse signals, or square wave signals, and the first phase, the second phase, the third phase, and the fourth phase, are 0 degree, 90 degrees, 180 degrees, and 270 degrees, respectively.

11. The distance measuring equipment of claim 8, wherein said control part
calculates a first quantity of light, that is charged in a photocell, of said first receiving signal received in said first phase,
calculates a second quantity of light, that is charged in the photocell, of said second receiving signal received in the second phase,
calculates a third quantity of light, that is charged in the photocell, of said third receiving signal received in the third phase,
calculates a fourth quantity of light, that is charged in the photocell, of said fourth receiving signal received in the fourth phase, and
calculates the phase difference between said transmitting and receiving signals based on the first, second third and fourth quantities of the lights.

12. The distance measuring equipment of claim 7, wherein said signal transmitter transmits said multiple optical transmitting signals to said target of measurement in order, and said multiple optical transmitting signals includes a first transmitting signal, a second transmitting signal, a third transmitting signal and a fourth transmitting signal, that are transmitted in that stated order based on a shutter speed of a shutter of the signal receiving part that receives the receiving signals.

* * * * *